T. BROWN.
TRACTOR HITCH.
APPLICATION FILED AUG. 16, 1919. RENEWED OCT. 28, 1921.
1,418,228.  Patented May 30, 1922.
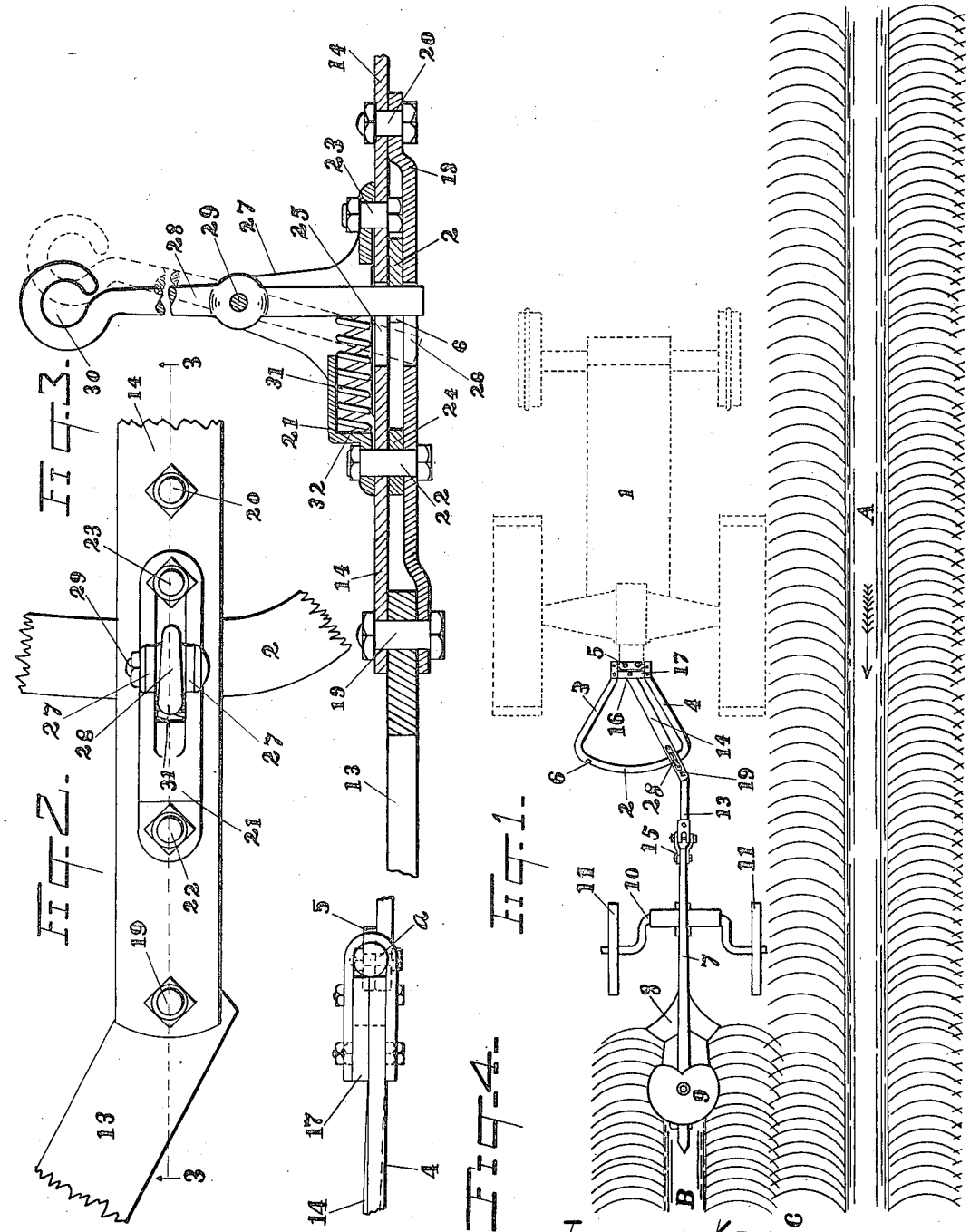

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

TRACTOR HITCH.

1,418,228.  Specification of Letters Patent.  Patented May 30, 1922.

Application filed August 16, 1919, Serial No. 318,061.  Renewed October 28, 1921.  Serial No. 511,107.

*To all whom it may concern:*

Be it known that I, THEOPHILUS BROWN, a citizen of the United States, residing at Moline, in the county of Rock Island and State of Illinois, have invented certain new and useful Improvements in Tractor Hitches, of which the following is a specification, reference being had therein to the accompanying drawing.

My invention relates to tractor drawn agricultural machinery and more particularly to means employed to connect machinery of this class to a tractor.

The object of my invention is to provide a hitch capable of adjustment laterally in either direction to properly locate for efficient work the machine used.

Referring to the drawings in which similar numerals indicate identical parts—

Figure 1 is a plan view showing a tractor, in dotted lines, to which a lister plow is hitched by my improved device, and also diagrammatically illustrating a completed furrow and one newly begun with the tractor and attached plow in the proper relative position.

Figure 2 is an enlarged detail plan view of the latching mechanism.

Figure 3 is a sectional detail on the line 3—3 of Figure 2, and

Figure 4 illustrates in detail the connection of the segment to the tractor.

A tractor 1 has secured on its rear, preferably on the frame, a segment 2 having arms 3 and 4 which converge to a bracket 5 to which is bolted a bar *a* extending laterally on opposite sides of the bracket 5 and rounded; the ends of the arms 3 and 4 are bent to fit loosely over the ends of the bar *a*, so that the connection of the segment with the tractor permits a vertically rocking movement of the segment to compensate for an uneven or broken ground configuration. At each end of the segment 2 is a notch 6. The lister includes a beam 7, a plow 8, a seat 9 on the beam, a crank axle 10 supporting the beam, and ground wheels 11 journaled on the axle. A draft bar comprising two sections 13 and 14, connects the plow to the tractor. The section 13 is pivotally secured, at its rear end, by a horizontal pivot to a clevis 15 on the plow beam. The section 14 is pivotally connected at 16 to a cross bar 17 bolted to the arms 3 and 4 of the segment and extends rearward beyond the segment 2 where it is pivotally joined to the section 13 by a vertical pivot.

To secure the draw bar in position as shown, or when it swings to the opposite end of the segment 2, I employ the following means: Beneath the segment 2, and parallel with the section 14 of the draw bar, I place a strap 18 having its rear end passing beneath the section 13 and secured thereto by a bolt 19 which extends through the sections 13 and 14 and forms the pivotal junction of the two sections of the draw bar. The forward end of the strap is secured to the section 14 by a bolt 20.

On the section 14 of the draw bar I mount a housing 21 and secure it rigidly in place by bolts 22 and 23, the latter passing through the section 14 and the forward end of the housing. The bolt 22 passes through the strap 18 and a spacing block 24, interposed between the strap 18 and the section 14, and then through the section 14 and the rearward end of the housing 21 and is secured by a suitable nut. Adapted to register with either of the notches 6, and with each other, are slots 25 and 26 in the section 14 and the strap 18 respectively. On opposite sides of the housing 21 are upstanding arms 27 between which I pivotally mount, intermediate its ends, a dog 28 which is adapted to be rocked about a bolt 29 which secures it between the arms 27.

The upper end of the dog 28 is provided with an eye 30 for a lanyard, not shown, to be extended forwardly to the tractor and convenient to the operator. The lower end of the dog passes through the slots 25 and 26 and is adapted to automatically engage with either of the notches 6 by pressure of a coil spring 31, in the housing 21, and exerting its pressure against the dog 28 and the rear wall 32 of the housing.

As shown in the drawings the lister has completed a furrow A traveling in the direction indicated by the arrow, and with the tractor has turned to cut a parallel furrow B with a ridge C between the furrows. It is obvious that in cutting furrow A the draw-bar was at the side of the segment 2 opposite to its position shown in the drawing, now when the turn was made to cut furrow B and form the ridge C, the operator on the tractor, by a pull of the lanyard connected to the eye 30, rocked the dog 28 until it was free from the notch 6 with which it was engaged, as shown by dotted lines in Figure 3, freeing the draw bar so that, as the tractor turned the segment 2 moves laterally between the section 14 and the strap 18, the dog 28 resting against the outside of the segment 2, the operator having released his hold of the lanyard as soon as the dog 28 was free and the tractor had begun to turn. While the tractor turns to assume a course parallel with furrow A, the segment 2 has been swung until the dog 28 registers with the notch 6 nearest the furrow already made, the expansion force of the spring 31 causing the dog and notch to automatically engage and hold the draw bar in position to pull the lister in the desired relative position with the tractor and the work.

What I claim is—

1. The combination with a tractor drawn implement of a hitching mechanism connecting the implement to the tractor including a segment mounted on the tractor, a drawbar pivotally connected forwardly to the segment and extending rearwardly to pivotal connection with the implement, and means to automatically secure said segment and drawbar together at either end of the segment.

2. The combination with a tractor drawn implement, of a hitching mechanism connecting the implement to the tractor including a segment pivotally mounted on the tractor for vertical movement and having a notch at each end, a drawbar pivotally connected forwardly to the segment and extending rearwardly to pivotal connection with the implement, and a latch on the drawbar adapted to automatically engage with either of the notches in the segment.

3. The combination with a tractor drawn implement, of a hitching mechanism connecting the implement to the tractor including a segment pivotally mounted on the tractor and having a notch at each end, a drawbar pivotally connected forwardly to the segment and extending rearwardly to pivotal connection with the implement, and a latch on the drawbar adapted to automatically engage with either of the notches in the segment and manually operable to be disengaged therefrom.

4. The combination with a tractor drawn implement, of a hitching mechanism connecting the implement to the tractor including a segment pivotally mounted on the tractor and having a notch at each end, a drawbar having a forward and a rear section, the forward section pivotally connected forwardly to the segment and extending rearwardly of the segment, the rear section pivotally connected to the forward section by a vertical pivot and connected to the implement by a horizontal pivot, and a latch on the forward section adapted to automatically engage with either of the notches in the segment and manually operable to be disengaged therefrom.

THEOPHILUS BROWN.